US012767671B2

(12) United States Patent
Ryu et al.

(10) Patent No.: US 12,767,671 B2
(45) Date of Patent: Oct. 20, 2026

(54) AMINOALKOXYDISILAZANE COMPOUNDS, COMPOSITION FOR DEPOSITING SILICON-CONTAINING THIN FILM CONTAINING THE SAME AND METHOD OF MANUFACTURING SILICON-CONTAINING THIN FILM USING THE SAME

(71) Applicant: DNF CO., LTD., Daejeon (KR)

(72) Inventors: Jiho Ryu, Daejeon (KR); Seung Son, Daejeon (KR); Jun Hee Cho, Daejeon (KR); Gun Joo Park, Daejeon (KR); Sung Gi Kim, Daejeon (KR); Yu Jin Cho, Daejeon (KR); Haeng-Don Lim, Daejeon (KR)

(73) Assignee: DNF CO., LTD., Daejeon (KR)

( * ) Notice: Subject to any disclaimer, the term of this patent is extended or adjusted under 35 U.S.C. 154(b) by 0 days.

(21) Appl. No.: 18/970,792

(22) Filed: Dec. 5, 2024

(65) Prior Publication Data

US 2026/0200957 A1 Jul. 16, 2026

(30) Foreign Application Priority Data

Dec. 8, 2023 (KR) ........................ 10-2023-0177811
Oct. 29, 2024 (KR) ........................ 10-2024-0149517

(51) Int. Cl.
*C07F 7/18* (2006.01)
*C09D 1/00* (2006.01)

(52) U.S. Cl.
CPC .............. *C07F 7/1804* (2013.01); *C09D 1/00* (2013.01)

(58) Field of Classification Search
CPC ................................ C07F 7/1804; C09D 1/00
See application file for complete search history.

(56) References Cited

U.S. PATENT DOCUMENTS

2025/0051914 A1* 2/2025 Yang ........................ C07F 7/10

FOREIGN PATENT DOCUMENTS

| | | | |
|---|---|---|---|
| KR | 20210146448 | A | 12/2021 |
| KR | 20230139282 | A | 10/2023 |
| KR | 10-2023-0151303 | A | 11/2023 |
| TW | 201936972 | A | 9/2019 |
| TW | 201938833 | A | 10/2019 |

* cited by examiner

*Primary Examiner* — Robert S Walters, Jr.
(74) *Attorney, Agent, or Firm* — Blank Rome LLP

(57) ABSTRACT

An aminoalkoxydisilazane compound, a composition for depositing a silicon-containing thin film including the aminoalkoxydisilazane compound, and a method of manufacturing a silicon-containing thin film using the aminoalkoxydisilazane compound are described. The aminoalkoxydisilazane compound is thermally stable and has strong volatility and reactivity, and is used as a silicon-containing precursor to form a silicon-containing thin film having excellent physical and electrical properties and high purity, by various deposition methods.

10 Claims, 1 Drawing Sheet

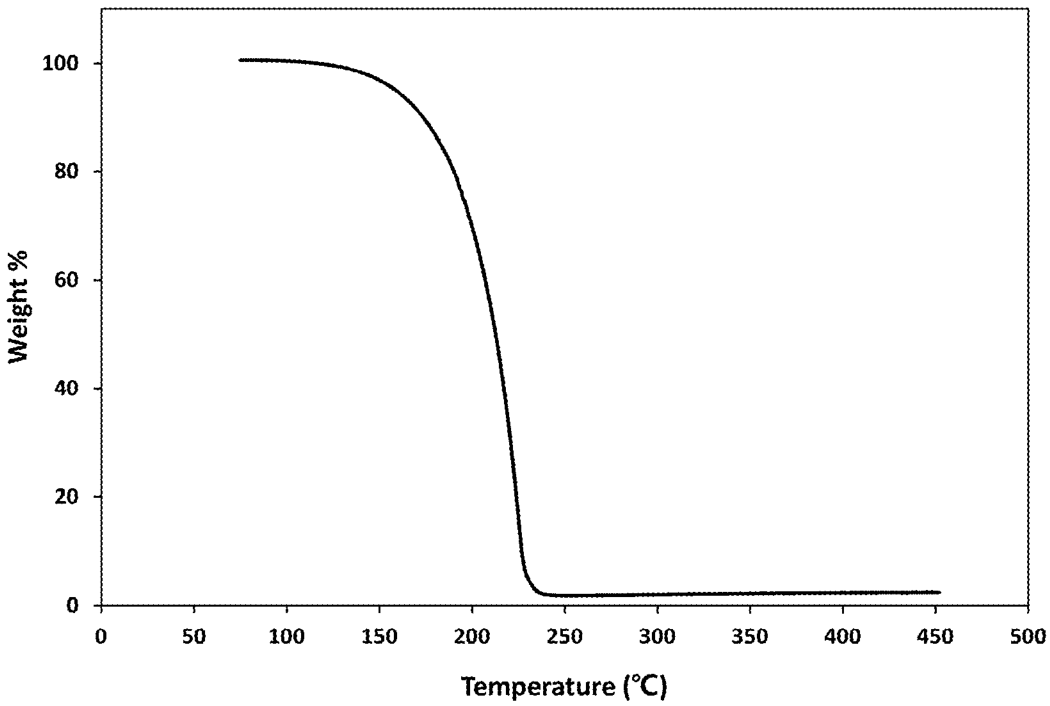
Weight %
100
80
60
40
20
0
0
50
100
150
200
250
300
350
400
450
500
Temperature (°C)

AMINOALKOXYDISILAZANE COMPOUNDS, COMPOSITION FOR DEPOSITING SILICON-CONTAINING THIN FILM CONTAINING THE SAME AND METHOD OF MANUFACTURING SILICON-CONTAINING THIN FILM USING THE SAME

CROSS-REFERENCE TO RELATED APPLICATIONS

This application claims priority under 35 U.S.C. § 119 to Korean Patent Application No. 10-2023-0177811, filed on Dec. 8, 2023, and Korean Patent Application No. 10-2024-0149517, filed on Oct. 29, 2024, the disclosures of which are incorporated herein by reference in their entirety.

TECHNICAL FIELD

The following disclosure relates to an aminoalkoxydisilazane compound, a composition for depositing a silicon-containing thin film including the same, and a method of manufacturing a silicon-containing thin film using the same.

BACKGROUND

A silicon-containing thin film is an essential material in semiconductor manufacturing, and is used in various forms such as a silicon film, a silicon oxide film, a silicon nitride film, a silicon carbonitride film, and a silicon oxynitride film. These thin films play an essential role in advanced electronic devices such as memory and logic chips, flat panel displays (TFTs), and solar cells, and are used as a semiconductor substrate, a diffusion mask, an anti-oxidation film, a dielectric film, and the like. Recently, a polycrystalline silicon thin film is applied to various fields such as solar cells, and its utility is increasing.

Various silicon precursors such as aminosilane and alkoxysilane, including conventional silicon precursors such as silane, disilane, and halogenated silane are being developed for deposition of a silicon-containing thin film, and a representative process includes chemical vapor deposition (CVD) and atomic layer deposition (ALD). In particular, since ALD is very effective for forming an ultra-fine thin film having a uniform thickness, it is essential for implementing micropatterns of the latest semiconductor devices. In addition, since deposition technology using plasma (PECVD and PEALD) allows deposition of a thin film at a low temperature, it has established itself as an important technology in manufacturing next-generation semiconductors and display devices.

Since recent ultra-fine semiconductor devices are rapidly becoming more miniaturized and highly integrated, requirements for a silicon precursor are getting stricter.

The precursor should be stable at normal temperature, have high volatility, have no nonvolatile by-products during a thin film deposition process, have excellent thermal stability and reactivity at a high temperature, and be easily handled, transported, and stored. A precursor having the properties is essential for high-quality thin film deposition.

Due to the development of ultra-highly integrated semiconductor devices, a conventional precursor has limitations in forming a uniform thin film at a low temperature and causes reduced productivity and problems in physical and electrical properties. Accordingly, development of a new silicon precursor which allows rapid and uniform deposition at a low temperature and has excellent physical properties is needed.

RELATED ART DOCUMENTS

Patent Document (Patent Document 1) KR 10-2023-0151303 A (Nov. 1, 2023)

SUMMARY

An embodiment of the present invention is directed to providing an aminoalkoxydisilazane compound which may be used as a precursor of a silicon-containing thin film and a composition for depositing a silicon-containing thin film including the same.

Another embodiment of the present invention is directed to providing a method of manufacturing a silicon-containing thin film using the aminoalkoxydisilazane compound or the composition for depositing a silicon-containing thin film including the same.

In one general aspect, an aminoalkoxydisilazane compound represented by the following Chemical Formula 1 is provided:

[Chemical Formula 1]

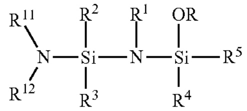

wherein $R^1$, $R^{11}$, and $R^{12}$ are independently of one another C1-C7 alkyl, C3-C7 cycloalkyl, or C2-C7 alkenyl, or $R^{11}$ and $R^{12}$ may be linked to each other to form a ring;

$R^2$ and $R^3$ are independently of each other C1-C7 alkyl, C3-C7 cycloalkyl, or C1-C7 alkoxy;

R is C1-C7 alkyl or C3-C7 cycloalkyl; and $R^4$ and $R^5$ are independently of each other C1-C7 alkyl, C3-C7 cycloalkyl, C1-C7 alkoxy, or C3-C7 cycloalkyloxy.

In another general aspect, a composition for depositing a silicon-containing thin film includes the aminoalkoxydisilazane compound according to the exemplary embodiment.

In still another general aspect, a method of manufacturing a silicon-containing thin film using the aminoalkoxydisilazane compound according to the exemplary embodiment or the composition for depositing a silicon-containing thin film including the same is provided.

Other features and aspects will be apparent from the following detailed description, the drawings, and the claims.

BRIEF DESCRIPTION OF THE DRAWINGS

FIG. 1 shows results of thermogravimetric analysis (TGA) of ((dimethylamino)dimethylsilyl)(trimethoxysilyl)(isopropyl)amine prepared in Example 1.

DETAILED DESCRIPTION OF EMBODIMENTS

In the present specification, unless otherwise defined, all technical terms and scientific terms have the same meanings as those commonly understood by a person skilled in the art to which the present invention pertains. The terms used herein are only for effectively describing a certain specific example and are not intended to limit the present invention.

The singular form used in the present specification may be intended to also include a plural form, unless otherwise indicated in the context.

Throughout the present specification, unless otherwise particularly stated, "comprising", "being equipped with", "containing", or "having" a constituent element does not mean excluding any other constituent element, but mean further including other constituent elements, and elements, materials, or processes which are not further listed are not excluded.

The numerical range used in the present specification includes all values within the range including the lower limit and the upper limit, increments logically derived in a form and spanning in a defined range, all double limited values, and all possible combinations of the upper limit and the lower limit in the numerical range defined in different forms. As an example, when it is defined that a content of a composition is 10% to 80% or 20% to 50%, it should be interpreted that a numerical range of 10% to 50% or 50% to 80% is also described in the specification of the present specification. Unless otherwise defined in the present specification, values which may be outside a numerical range due to experimental error or rounding off of a value are also included in the defined numerical range.

Unless otherwise particularly defined in the present specification, "about" may be considered as a value within 30%, 25%, 20%, 15%, 10%, or 5% of a stated value.

Units used in the present specification without particular mention are based on weights, and as an example, a unit of % or ratio refers to a wt % or a weight ratio, and wt % refers to wt % of any one component in a total composition, unless otherwise defined.

The term "$C_A$-$C_B$" in the present specification refers to "having A or more and B or fewer carbon atoms", and the term "A to B" refers to "A or more and B or less".

The term "alkyl" in the present specification refers to a monovalent organic radical derived from a straight chain or branched chain saturated hydrocarbon, which has 1 to 7, 1 to 5, 1 to 4, or 1 to 3 carbon atoms, and for example, may include methyl, ethyl, propyl, isopropyl, butyl, t-butyl, isobutyl, pentyl, and the like.

The term "cycloalkyl" in the present specification refers to a monovalent saturated carbocyclic radical formed of one or more rings. An example of the cycloalkyl radical includes cyclopropyl, cyclobutyl, cyclopentyl, cyclohexyl, cycloheptyl, and the like, but is not limited thereto.

The term "alkenyl" in the present specification refers to a straight chain or branched chain hydrocarbon radical containing 2 to 7 carbon atoms and one or more carbon to carbon double bonds. Specifically, the alkenyl is a lower alkenyl radical having 2 to 7, 2 to 5, 2 to 4, or 2 or 3 carbon atoms. An example of the alkenyl radical may include vinyl, propenyl, isopropenyl, allyl, butenyl, 4-methylbutenyl, and the like. The alkenyl may include a cis- and trans-oriented, or alternatively, E- and Z-oriented radical.

In the present specification, "normal temperature" may refer to a temperature in a state without artificial temperature adjustment, and, for example, the normal temperature may be 20° C. to 40° C., 20° C. to 30° C., or 23° C. to 26° C.

Hereinafter, the present disclosure will be described in detail. However, it is only illustrative, and the present disclosure is not limited to the specific exemplary embodiment which is illustratively described.

An exemplary embodiment of the present invention provides an aminoalkoxydisilazane compound as a precursor for manufacturing a high-quality silicon-containing thin film. Specifically, the aminoalkoxydisilazane compound according to an exemplary embodiment represented by the following Chemical Formula 1:

[Chemical Formula 1]

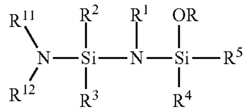

wherein $R^1$, $R^{11}$, and $R^{12}$ are independently of one another C1-C7 alkyl, C3-C7 cycloalkyl, or C2-C7 alkenyl, or $R^{11}$ and $R^{12}$ may be linked to each other to form a ring;

$R^2$ and $R^3$ are independently of each other C1-C7 alkyl, C3-C7 cycloalkyl, or C1-C7 alkoxy;

R is C1-C7 alkyl or C3-C7 cycloalkyl; and $R^4$ and $R^5$ are independently of each other C1-C7 alkyl, C3-C7 cycloalkyl, C1-C7 alkoxy, or C3-C7 cycloalkyloxy.

The aminoalkoxydisilazane compound according to an exemplary embodiment has a disilazane skeleton of Si—N—Si and has a structure in which an amino substituent is introduced to one Si and at least one alkoxy substituent is introduced to another Si. Since the aminoalkoxydisilazane compound according to an exemplary embodiment has lower activation energy and excellent thermal stability depending on the structural characteristics described above, a structure in which silicon moieties on both sides of N in the middle of a disilazane skeleton are asymmetric and has significantly improved reactivity, and does not produce nonvolatile by-products, a high-quality silicon-containing thin film may be easily formed with a high deposition rate. The aminoalkoxydisilazane compound according to an exemplary embodiment is present in a liquid state at normal temperature under handleable pressure and is easily handled.

In an exemplary embodiment, in Chemical Formula 1, $R^1$, $R^{11}$, and $R^{12}$ may be independently of one another C1-C5 alkyl, C3-C7 cycloalkyl, or C2-C4 alkenyl, or $R^{11}$ and $R^{12}$ may be linked via C2-C7 alkylene to form a ring; $R^2$ and $R^3$ may be independently of each other C1-C5 alkyl or C3-C7 cycloalkyl; R may be C1-C5 alkyl or C3-C7 cycloalkyl; and $R^4$ and $R^5$ may be independently of each other C1-C5 alkyl, C3-C7 cycloalkyl, or C1-C5 alkoxy.

In a specific example, in Chemical Formula 1, $R^1$, $R^{11}$, and $R^{12}$ may be independently of one another C1-C4 alkyl, C3-C6 cycloalkyl, or C2-C3 alkenyl; $R^2$, $R^3$, and R may be independently of one another C1-C4 alkyl or C3-C6 cycloalkyl; $R^4$ may be C1-C4 alkoxy or C3-C6 cycloalkyloxy; and $R^5$ may be C1-C4 alkyl, C3-C6 cycloalkyl, or C1-C4 alkoxy.

In a specific example, in Chemical Formula 1, $R^1$ may be C1-C4 alkyl, C3-C6 cycloalkyl, or C2-C3 alkenyl; $R^{11}$ and $R^{12}$ may be linked via C2-C6 alkylene to form a ring; $R^2$, $R^3$, and R may be independently of one another C1-C4 alkyl or C3-C6 cycloalkyl; and $R^4$ and $R^5$ may be independently of each other C1-C4 alkyl, C3-C6 cycloalkyl, or C1-C4 alkoxy.

In a specific example, in Chemical Formula 1, $R^1$, $R^{11}$, and $R^{12}$ may be independently of one another C1-C4 alkyl or C2-C3 alkenyl; $R^2$, $R^3$, and R may be independently of one another C1-C4 alkyl; and $R^4$ and $R^5$ may be independently of each other C1-C4 alkyl or C1-C4 alkoxy.

In a specific example, in Chemical Formula 1, $R^1$, $R^2$, $R^3$, R, $R^{11}$, and $R^{12}$ may be independently of one another C1-C4 alkyl; and $R^4$ and $R^5$ may be independently of each other C1-C4 alkyl or C1-C4 alkoxy.

In an exemplary embodiment, the aminoalkoxydisilazane compound may be represented by the following Chemical Formula 2 or 3:

[Chemical Formula 2]

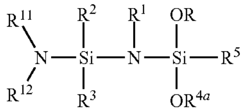

[Chemical Formula 3]

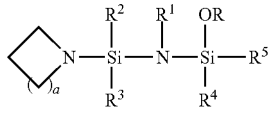

wherein $R^1$, $R^{11}$, and $R^{12}$ are independently of one another C1-C4 alkyl, C3-C6 cycloalkyl, or C2-C3 alkenyl;

$R^2$, $R^3$, R, and $R^{4a}$ are independently of one another C1-C4 alkyl or C3-C6 cycloalkyl;

$R^4$ and $R^5$ are independently of each other C1-C4 alkyl, C3-C6 cycloalkyl, or C1-C4 alkoxy; and a is an integer of 0 to 4.

In a specific example, $R^1$, $R^{11}$, and $R^{12}$ may be independently of one another C1-C4 alkyl or C2-C3 alkenyl; $R^2$, $R^3$, R, and $R^{4a}$ may be independently of one another C1-C4 alkyl; $R^4$ and $R^5$ may be independently of each other C1-C4 alkyl or C1-C4 alkoxy; and a may be an integer of 0 to 3.

In an exemplary embodiment, the aminoalkoxydisilazane compound may be represented by the following Chemical Formula 4:

[Chemical Formula 4]

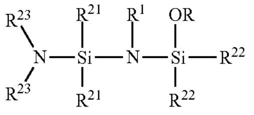

wherein $R^1$ is C1-C4 alkyl or C2-C3 alkenyl;

$R^{21}$ is C1-C4 alkyl;

$R^{22}$ is C1-C4 alkyl or C1-C4 alkoxy;

R is C1-C4 alkyl; and $R^{23}$ is C1-C4 alkyl or C2-C3 alkenyl.

As an example, $R^1$ may be C1-C3 alkyl or C2-C3 alkenyl, and as a specific example, may be methyl, ethyl, isopropyl, vinyl, isopropenyl, or allyl.

As an example, $R^{21}$ may be C1-C3 alkyl, and as a specific example, may be methyl or ethyl.

As an example, $R^{22}$ may be C1-C3 alkyl or C1-C3 alkoxy, and as a specific example, may be methyl, ethyl, methoxy, or ethoxy.

As an example, R may be C1-C3 alkyl, and as a specific example, may be methyl or ethyl.

As an example, $R^{23}$ may be C1-C3 alkyl or C2-C3 alkenyl, and as a specific example, may be methyl, ethyl, isopropyl, vinyl, isopropenyl, or allyl.

In an exemplary embodiment, the aminoalkoxydisilazane compound may be selected from the following compounds, but is not limited thereto:

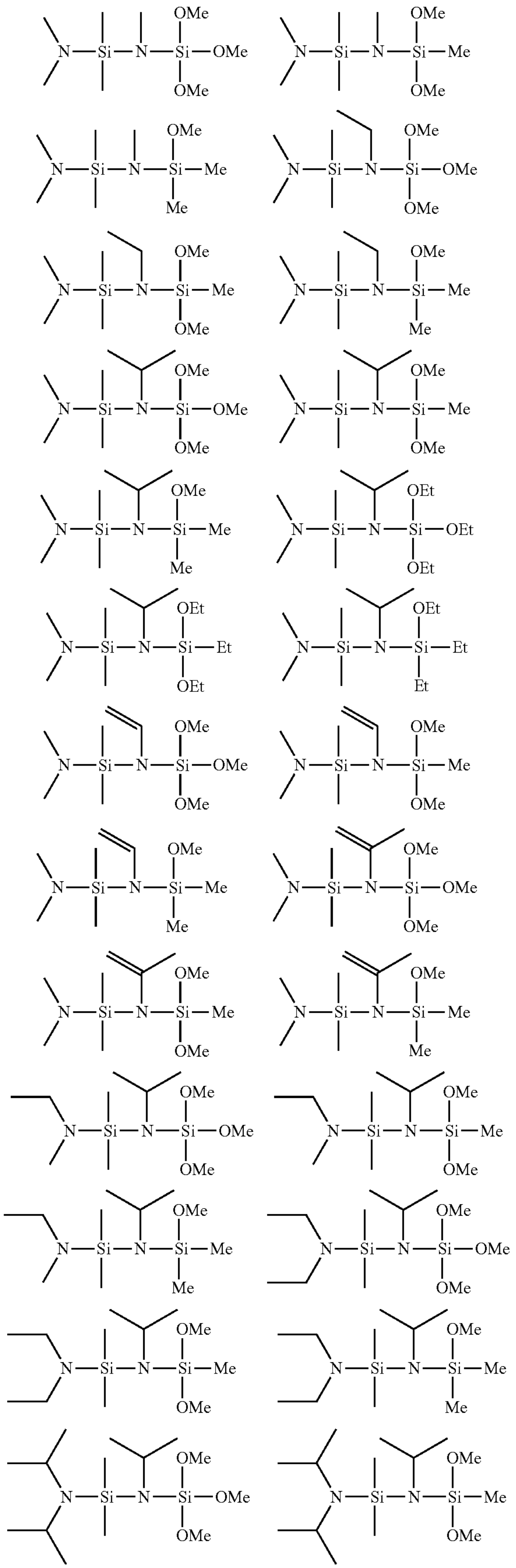

-continued

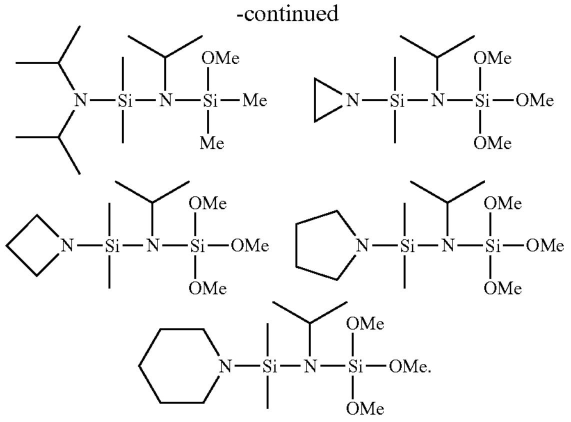

The aminoalkoxydisilazane compound described above may be prepared by any method allowed within a range which may be recognized by a person skilled in the art.

Another exemplary embodiment of the present invention provides a composition for depositing a silicon-containing thin film including the aminoalkoxydisilazane compound according to an exemplary embodiment.

In an exemplary embodiment, the composition for depositing a silicon-containing thin film includes the amino-alkoxydisilazane compound having high volatility and excellent thermal stability as a precursor for depositing a thin film, and its content may be within a range which may be recognized by a person skilled in the art, considering thin film formation conditions, thin film thickness, properties, and the like.

Another exemplary embodiment of the present invention provides a method of manufacturing a silicon-containing thin film including depositing a silicon-containing thin film using the aminoalkoxydisilazane compound represented by Chemical Formula 1 or the composition for depositing a silicon-containing thin film including the compound.

In an exemplary embodiment, since the method of manufacturing a silicon-containing thin film uses the amino-alkoxydisilazane compound as a precursor, a high-quality silicon-containing thin film may be manufactured with a high deposition rate under various conditions. In an exemplary embodiment, the method of manufacturing a silicon-containing thin film may be applied without limitation as long as it is a method allowed within a range which may be recognized by a person skilled in the art, and for example, may be performed by atomic layer deposition (ALD), chemical vapor deposition (CVD), metalorganic chemical vapor deposition (MOCVD), low pressure chemical vapor deposition (LPCVD), plasma-enhanced chemical vapor deposition (PECVD), or plasma-enhanced atomic layer deposition (PEALD).

In an exemplary embodiment, the aminoalkoxydisilazane compound and reaction gas may be continuously or discontinuously supplied, respectively, and the discontinuous supply may include a pulse type.

As an example, the method of manufacturing a silicon-containing thin may include: a) maintaining a temperature of a substrate mounted in a chamber at 100° C. or higher; b) adsorbing the aminoalkoxydisilazane compound according to an exemplary embodiment or a composition for depositing a silicon-containing thin film including the compound onto the substrate; and c) injecting a reaction gas into the substrate onto which the aminoalkoxydisilazane compound or the composition for depositing a silicon-containing thin film including the compound is adsorbed to deposit a silicon-containing thin film.

The method of manufacturing a silicon-containing thin film may further include removing an unreacted reactant by purging.

Specifically, the method of manufacturing a silicon-containing thin film may include: a) maintaining a temperature of a substrate mounted in a chamber at 100 to 700° C.; b-1) adsorbing the aminoalkoxydisilazane compound according to an exemplary embodiment or a composition for depositing a silicon-containing thin film including the compound onto the substrate; b-2) purging a residual aminoalkoxydisilazane compound or a residual composition for depositing a thin film and by-product; c-1) injecting a reaction gas into the substrate onto which the aminoalkoxydisilazane compound or the composition for depositing a thin film including the compound is adsorbed and forming a silicon-containing thin film; and c-2) purging residual reaction gas and by-products.

As an example, the method of manufacturing a silicon-containing thin film may further include generating plasma after step a), when the process is performed by plasma-enhanced atomic layer deposition (PEALD) or plasma-enhanced chemical vapor deposition (PECVD).

As an example, in step b) of the method of manufacturing a silicon-containing thin film, the aminoalkoxydisilazane compound or the composition for depositing a silicon-containing thin film including the compound may be injected with a carrier gas.

The reaction gas may be any gas as long as it is commonly used with a precursor considering the type of the silicon-containing thin film, and as a specific example, may be any one or two or more selected from oxygen ($O_2$), ozone ($O_3$), distilled water ($H_2O$), hydrogen peroxide ($H_2O_2$), nitrogen monoxide (NO), nitrous oxide ($N_2O$), nitrogen dioxide ($NO_2$), ammonia ($NH_3$), nitrogen ($N_2$), hydrazine ($N_2H_4$), amine, diamine, carbon monoxide (CO), carbon dioxide ($CO_2$), C1 to C12 saturated or unsaturated hydrocarbon, and hydrogen.

The carrier gas may be one or two or more selected from argon, helium, and nitrogen, but is not limited thereto.

In an exemplary embodiment, deposition conditions may be adjusted depending on the structure or characteristics of the thin film to be desired, and an example of the deposition conditions may be the input flow rate of the aminoalkoxydisilazane compound or the composition for depositing a silicon-containing thin film including the compound, reaction gas, the input flow rate of carrier gas, pressure, RF power, substrate temperature, and the like. As a specific example, the input flow rate of the aminoalkoxydisilazane or the composition for depositing a silicon-containing thin film may be adjusted to 10 to 1,000 cc/min, the carrier gas may be adjusted to 10 to 1, 000 cc/min, the flow rate of the reaction gas may be adjusted to 1 to 1, 500 cc/min, the pressure may be adjusted to 0.5 to 10 torr, the RF power may be adjusted to 50 to 1, 000 W, and the substrate temperature may be 100 to 700° C., 300 to 700° C., or 400 to 700° C., but there are not limited thereto.

The substrate may be a substrate including one or more semiconductor materials of Si, Ge, SiGe, GaP, GaAs, SiC, SiGeC, InAs, and InP; a silicon on insulator (SOI) substrate; a quartz substrate; a glass substrate for display; a flexible plastic substrate such as polyimide, polyethylene terephthalate (PET), polyethylene naphthalate (PEN), polymethyl methacrylate (PMMA), polycarbonate (PC), polyethersulfone (PES), and polyester; and the like, but is not limited thereto.

In addition, a plurality of conductive layers, dielectric layers, insulating layers, or the like may be formed between the substrate and the silicon-containing thin film, in addition to formation of the silicon-containing thin film directly on the substrate.

According to an exemplary embodiment, a high-quality silicon-containing thin film may be manufactured by using the aminoalkoxydisilazane compound described above as a precursor.

As an example, the silicon-containing thin film may be any thin film which may be manufactured within a range which may be recognized by a person skilled in the art, and specifically, may be a silicon oxide ($SiO_2$) film, a silicon oxycarbide (SiOC) film, a silicon nitride (SiN) film, a silicon oxynitride (SiON) film, a silicon carbonitride (SiCN) film, a silicon carbide (Sic) film, or the like, and in addition to them, various high-quality thin films containing silicon may be manufactured within a range which may be recognized by a person skilled in the art and may be used as a gate insulating film, a dielectric film of capacitor, a tunnel insulating film of a non-volatile memory device, and the like.

Hereinafter, the present invention will be described in more detail by the following examples. Prior to that, terms and words used in the present specification and claims are not to be construed as having a general or dictionary meaning but are to be construed as having meaning and concepts meeting the technical ideas of the present invention, based on a principle that the inventors may appropriately define the concepts of terms in order to describe their own inventions in best mode.

Therefore, the configurations illustrated in the examples and drawings described in the present specification are merely the most preferred exemplary embodiment of the present invention but do not represent all of the technical spirit of the present invention. Thus, it should be understood that there are various equivalents and modified examples to replace them at the time of filing the present application.

Hereinafter, the synthesis example was performed under anhydrous and inert atmosphere using a glove box or Schlenk tube. The structure of the aminoalkoxydisilazane compound was analyzed by NMR spectrum (Nuclear Magnetic Resonance, NMR, 400 MHz Ultrashield, Buruker). The thermal stability, the volatility, and the decomposition temperature of the aminoalkoxydisilazane compound was analyzed by thermogravimetric analysis (TGA, L81-II, LINSEIS).

[Example 1] Synthesis of ((dimethylamino)dimethylsilyl)(trimethoxysilyl)(isopropyl)amine)

Step 1: Synthesis of 1-chloro-N-isopropyl-1, 1-dimethylsilanamine

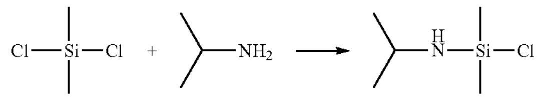

311.16 g (2.411 mol) of dichlorodimethylsilane ($(CH_3)_2SiCl_2$) and 3,319 mL (24.110 mol) of n-pentane ($n\text{-}C_5H_{12}$) were added to a flame dried 10 L flask under an anhydrous and inert atmosphere, 285.03 g (4.821 mol) of isopropylamine ($(CH_3)_2CHNH_2$) was slowly added while maintaining the internal temperature at −20° C. After completing the addition, stirring was performed at normal temperature for 3 hours to complete the reaction. The reaction mixture was filtered to remove an isopropylamine hydrochloride ($(CH_3)_2CHNH_2\cdot HCl$), the solvent was removed under reduced pressure from the obtained filtrate, and distillation under reduced pressure was performed under the conditions of 60° C. @ 100 torr to obtain 1-chloro-N-isopropyl-1,1-dimethylsilaneamine ($(CH_3)_2CHNHSi(CH_3)_2Cl$) as a target compound (yield: 73%).

$^1$H-NMR ($C_6D_6$): δ 0.25 (s, 6H, $Si(CH_3)_2$), 0.92 (d, 6H, $(CH(CH_3)_2$), 2.99 (m, 1H, CH)

Step 2: Synthesis of Lithium Dimethylamide

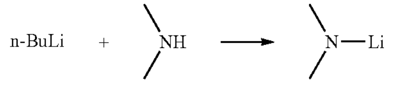

917 mL (2.411 mol) of 2.63 M n-butyllithium ($n\text{-}C_4H_9Li$) and 786 mL (6.027 mol) of n-hexane ($n\text{-}C_6H_{14}$) were added to a flame dried 3 L flask under an anhydrous and inert atmosphere, 114.12 g (2.532 mol) of dimethylamine ($(CH_3)_2NH$) was slowly added while maintaining the internal temperature at −20° C. After completing the addition, stirring was performed at normal temperature for 3 hours to complete the reaction. After completing the reaction, the solvent was removed under reduced pressure in vacuum, and drying was performed to equivalently obtain lithium dimethylamide ($LiN(CH_3)_2$) as a target compound.

Step 3: Synthesis of (dimethylamino)(isopropylamino)dimethylsilane

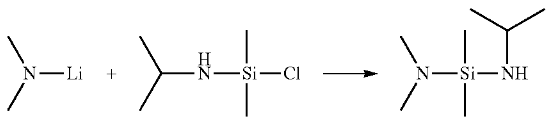

15.79 g (0.309 mol) lithium of dimethylamide ($LiN(CH_3)_2$) synthesized in Step 2 and 2,140 mL (18.569 mol) of n-pentane ($n\text{-}C_5H_{12}$) were added to a flame dried 4 L flask under am anhydrous and inert atmosphere, and 46.95 g (0.309 mol) of 1-chloro-N-isopropyl-1,1-dimethylsilaneamine ($(CH_3)_2CHNHSi(CH_3)_2Cl$) synthesized in Step 1 was added while maintaining the internal temperature at −40° C. After completing the addition, stirring was performed at normal temperature for 3 hours to complete the reaction. The reaction mixture was filtered to remove lithium chloride salt (LiCl), the solvent was removed under reduced pressure from the obtained filtrate, and distillation under reduced pressure was performed under the conditions of 25° C. @ 50 torr to obtain (0.185 29.6 g mol) of (dimethylamino)(isopropylamino)dimethylsilane ($(CH_3)_2NSi(CH_3)_2NHCH(CH_3)_2$) as a target compound (yield: 60%).

$^1$H-NMR ($C_6D_6$): δ 0.07 (s, 6H, $Si(CH_3)_2$), 0.29 (br, 1H, NH), 1.00 (d, 6H, $CH(CH_3)_2$), 2.49 (s, 6H SIN $(CH_3)_2$), 2.99 (ds, 1H, CH)

$^{13}$C NMR ($C_6D_6$): δ −1.96 ($SiCH_3$), 27.8 ($CHCH_3$), 37.5 ($SiNCH_3$), 42.6 (CH) 29Si-NMR ($C_6D_6$): 0-7.5

Step 4: Synthesis of ((dimethylamino)dimethylsilyl)(trimethoxysilyl)(isopropyl)amine)

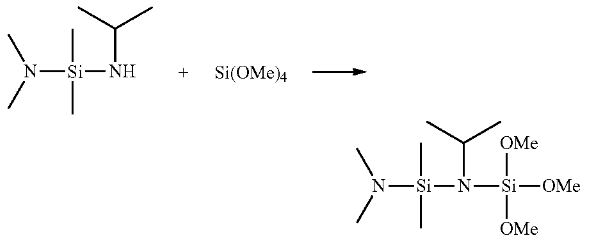

50 g (0.195 mol) of (dimethylamino)(isopropylamino) dimethylsilane ($(CH_3)_2NSi(CH_3)_2NHCH(CH_3)_2$) synthesized in Step 3 and 1, 527 mL (11.707 mol) of n-hexane ($n-C_6H_{14}$) were added to a flame dried 3 L flask under am anhydrous and inert atmosphere, 74 mL (0.195 mol) of 2.63M n-butyllithium ($n-C_4H_9Li$) was slowly added while maintaining the internal temperature at −50° C., and stirring was performed at normal temperature for 3 hours. When the stirring was completed, 29.71 g (0.195 mol) of tetramethyl orthosilicate ($Si(OCH_3)_4$) was slowly added to the reaction mixture, stirring was performed at normal temperature for 24 hours, and the reaction was completed. The reaction mixture was filtered to remove lithium methoxide ($Li-OCH_3$), the solvent was removed under reduced pressure from the obtained filtrate, and distillation under reduced pressure was performed under the conditions of 48° C. @ 0.5 torr to obtain 29 g (0.103 mol) of (dimethylamino) dimethylsilyl)(trimethoxysilyl)(isopropyl)amine ($(CH_3)_2NSi(CH_3)_2N\ (CH(CH_3)_2)\ Si(OCH_3)_3$) as a colorless liquid (yield: 53%).

$^1H$-NMR ($C_6D_6$): δ 0.29 (s, 6H, $Si(CH_3)_2$), 1.32 (d, 6H, $CH(CH_3)_2$), 2.53 (s, 6H, N $(CH_3)_2$), 3.44 (s, 9H, Si $(OCH_3)_3$), 3.29 (m, 1H, $CH(CH_3)_2$)

$^{13}C$-NMR ($C_6D_6$): δ 25.1, 37.70, 45.54, 49.76

$^{29}Si$-NMR ($C_6D_6$): δ −3.96, −62.73

FIG. 1 shows results of thermogravimetric analysis (TGA) of ((dimethylamino)dimethylsilyl)(trimethoxysilyl)(isopropyl) a mine prepared in Example 1. Referring to FIG. 1, it was found that the compound of Example 1 had rapid vaporization characteristics and 99.9 wt % or more of the compound was vaporized without a residual material due to thermal decomposition at about 240° C. It was found therefrom that the compound of Example 1 had excellent thermal stability and excellent volatility.

Since the aminoalkoxydisilazane compound according to the present invention has excellent volatility and thermal stability, is present in a liquid state at normal temperature and normal pressure so to be excellent for storage and handling, and has high reactivity, it is used as a precursor for depositing a silicon-containing thin film and may form a high-purity and high-quality silicon-containing thin film.

Since the aminoalkoxydisilazane compound according to the present invention is used as the precursor for depositing a thin film, a high-quality silicon-containing thin film having a high silicon content and excellent thermal stability and durability may be manufactured.

In addition, a silicon-containing thin film manufactured from the aminoalkoxydisilazane compound according to the present invention has excellent chemical and thermal stability and excellent durability and electrical properties.

Hereinabove, although the present invention has been described by specified matters and specific exemplary embodiments, they have been provided only for assisting in the entire understanding of the present invention. Therefore, the present invention is not limited by the specific matters limited to the exemplary embodiments. Various modifications and changes may be made by those skilled in the art to which the present invention pertains from this description. Therefore, the spirit of the present invention should not be limited to the above-described exemplary embodiments, and the following claims as well as all modifications equal or equivalent to the claims are intended to fall within the scope and spirit of the invention.

What is claimed is:

1. An aminoalkoxydisilazane compound represented by the following Chemical Formula 1:

[Chemical Formula 1]

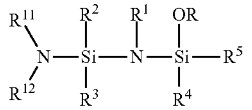

wherein:

$R^1$, $R^{11}$, and $R^{12}$ are independently of one another C1-C7 alkyl, C3-C7 cycloalkyl, or C2-C7 alkenyl, or $R^{11}$ and $R^{12}$ may be linked to each other to form a ring;

$R^2$ and $R^3$ are independently of each other C1-C7 alkyl, C3-C7 cycloalkyl, or C1-C7 alkoxy;

R is C1-C7 alkyl or C3-C7 cycloalkyl; and $R^4$ and $R^5$ are independently of each other C1-C7 alkyl, C3-C7 cycloalkyl, C1-C7 alkoxy, or C3-C7 cycloalkyloxy.

2. The aminoalkoxydisilazane compound of claim 1, wherein:

$R^1$, $R^{11}$, and $R^{12}$ are independently of one another C1-C5 alkyl, C3-C7 cycloalkyl, or C2-C4 alkenyl, or $R^{11}$ and $R^{12}$ may be linked via C2-C7 alkylene to form a ring;

$R^2$ and $R^3$ are independently of each other C1-C5 alkyl or C3-C7 cycloalkyl;

R is C1-C5 alkyl or C3-C7 cycloalkyl; and $R^4$ and $R^5$ are independently of each other C1-C5 alkyl, C3-C7 cycloalkyl, or C1-C5 alkoxy.

3. The aminoalkoxydisilazane compound of claim 2, wherein:

$R^1$, $R^2$, $R^3$, R, $R^{11}$, and $R^{12}$ are each C1-C4 alkyl; and $R^4$ and $R^5$ are independently of each other C1-C4 alkyl or C1-C4 alkoxy.

4. The aminoalkoxydisilazane compound of claim 1, wherein the aminoalkoxydisilazane compound is represented by the following Chemical Formula 2 or 3:

[Chemical Formula 2]

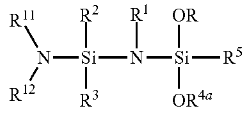

[Chemical Formula 3]

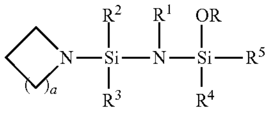

wherein:

$R^1$, $R^{11}$, and $R^{12}$ are independently of one another C1-C4 alkyl, C3-C6 cycloalkyl, or C2-C3 alkenyl;

$R^2$, $R^3$, R, and $R^{4a}$ are independently of one another C1-C4 alkyl or C3-C6 cycloalkyl;

$R^4$ and $R^5$ are independently of each other C1-C4 alkyl, C3-C6 cycloalkyl, or C1-C4 alkoxy; and a is an integer of 0 to 4.

5. The aminoalkoxydisilazane compound of claim 4, wherein:

$R^1$, $R^{11}$, and $R^{12}$ are independently of one another C1-C4 alkyl or C2-C3 alkenyl;

$R^2$, $R^3$, R, and $R^{4a}$ are each C1-C4 alkyl;

$R^4$ and $R^5$ are independently of each other C1-C4 alkyl or C1-C4 alkoxy; and a is an integer of 0 to 3.

6. The aminoalkoxydisilazane compound of claim 1, wherein the aminoalkoxydisilazane compound is selected from the following structures:

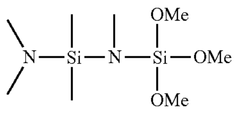
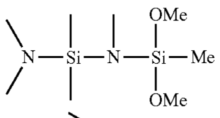
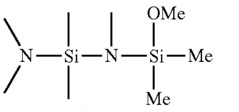
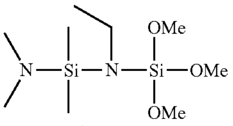
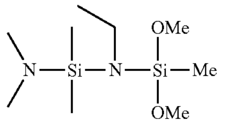
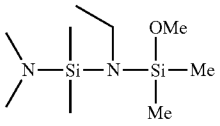
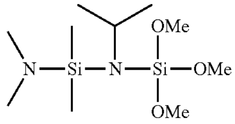
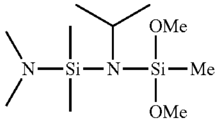
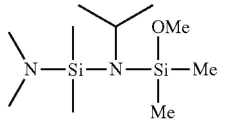
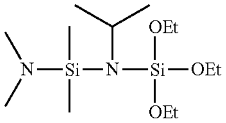
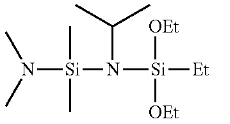
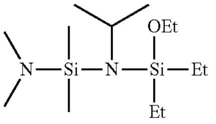
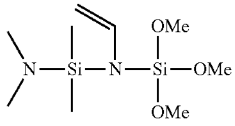
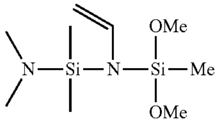
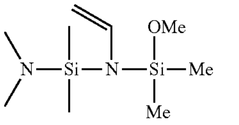
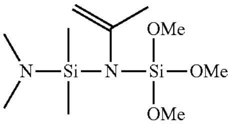
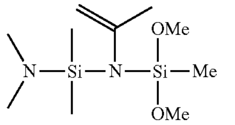
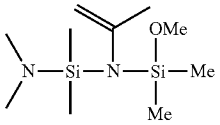
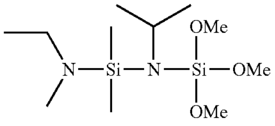
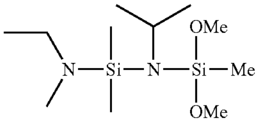

-continued

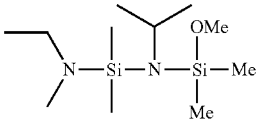
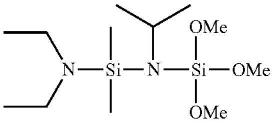
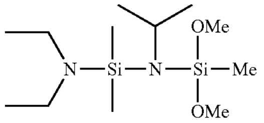
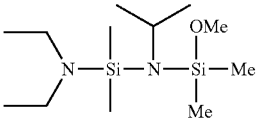
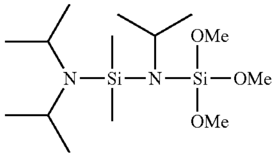
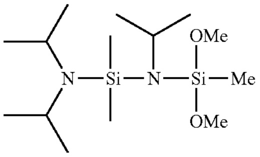
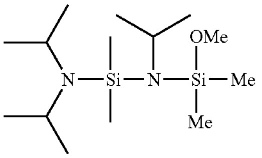
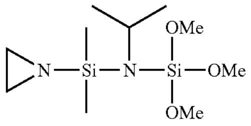
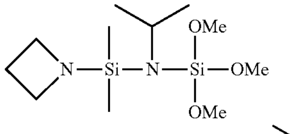
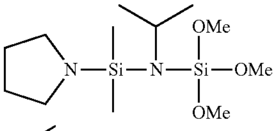
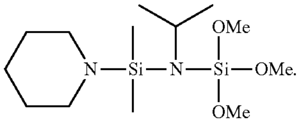

7. A composition for depositing a silicon-containing thin film comprising the aminoalkoxydisilazane compound of claim 1.

8. A method of manufacturing a silicon-containing thin film, the method comprising:

depositing a silicon-containing thin film using (i) an aminoalkoxydisilazane compound represented by the following Chemical Formula 1 or (ii) a composition for depositing a silicon-containing thin film comprising the aminoalkoxydisilazane compound represented by the following Chemical Formula 1:

[Chemical Formula 1]

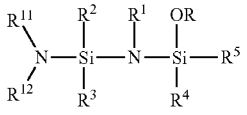

wherein:

$R^1$, $R^{11}$, and $R^{12}$ are independently of one another C1-C7 alkyl, C3-C7 cycloalkyl, or C2-C7 alkenyl, or $R^{11}$ and $R^{12}$ may be linked to each other to form a ring;

$R^2$ and $R^3$ are independently of each other C1-C7 alkyl, C3-C7 cycloalkyl, or C1-C7 alkoxy;

R is C1-C7 alkyl or C3-C7 cycloalkyl; and $R^4$ and $R^5$ are independently of each other C1-C7 alkyl, C3-C7 cycloalkyl, C1-C7 alkoxy, or C3-C7 cycloalkyloxy.

9. The method of claim 8, wherein the depositing is performed by atomic layer deposition (ALD), chemical vapor deposition (CVD), metalorganic chemical vapor deposition (MOCVD), low pressure chemical vapor deposition (LPCVD), plasma-enhanced chemical vapor deposition (PECVD), or plasma-enhanced atomic layer deposition (PEALD).

10. The method of claim 8, wherein the silicon-containing thin film is a silicon oxide ($SiO_2$) film, a silicon oxycarbide (SiOC) film, a silicon nitride (SiN) film, a silicon oxynitride (SiON) film, a silicon carbonitride (SiCN) film, or a silicon carbide (SiC) film.

* * * * *